US011657931B2

(12) United States Patent
Pittau

(10) Patent No.: US 11,657,931 B2
(45) Date of Patent: May 23, 2023

(54) METHOD FOR MANUFACTURING AN ELECTRICAL HARNESS

(71) Applicant: AIRBUS HELICOPTERS, Cedex (FR)

(72) Inventor: Serge Pittau, La Bouilladisse (FR)

(73) Assignee: AIRBUS HELICOPTERS, Marignane (FR)

(*) Notice: Subject to any disclaimer, the term of this patent is extended or adjusted under 35 U.S.C. 154(b) by 64 days.

(21) Appl. No.: 17/350,421

(22) Filed: Jun. 17, 2021

(65) Prior Publication Data

US 2022/0013250 A1 Jan. 13, 2022

(30) Foreign Application Priority Data

Jul. 10, 2020 (FR) ...................................... 2007329

(51) Int. Cl.
*H01B 13/012* (2006.01)
*H01B 19/00* (2006.01)
(Continued)

(52) U.S. Cl.
CPC ... *H01B 13/01209* (2013.01); *H01B 13/0016* (2013.01); *H01B 13/012* (2013.01);
(Continued)

(58) Field of Classification Search
CPC .......... H01B 13/01209; H01B 13/0016; H01B 13/012; H01B 19/00; H01B 7/0045;
(Continued)

(56) References Cited

U.S. PATENT DOCUMENTS 3,700,786 A * 10/1972 Lawrenson .............. H01B 7/08 174/72 A
4,859,953 A * 8/1989 Young .................... G01R 31/50 361/827

(Continued)

FOREIGN PATENT DOCUMENTS

CN 202984522 U 6/2013
CN 203804096 U 9/2014

(Continued)

OTHER PUBLICATIONS

Australian Examination Report No. 1, dated Jun. 20, 2022, Application No. 2021204174, Applicant Airbus Helicopters, 11 Pages.

(Continued)

*Primary Examiner* — Timothy J Thompson
*Assistant Examiner* — Michael F McAllister
(74) *Attorney, Agent, or Firm* — Brooks Kushman P.C.

(57) ABSTRACT

A method for manufacturing an electrical harness comprising a reference member and a secondary member and at least one electric wire, a protective sheath and at least two shrink sleeves comprising a reference shrink sleeve and a secondary shrink sleeve. According to the disclosure, the method comprises at least the following steps: assembling of the electric wire, the protective sheath, the two shrink sleeves, the reference member and the secondary member, the two shrink sleeves being arranged in a non-contracted state; in a reference portion of the electrical harness, reference contraction of the reference shrink sleeve; in a secondary portion of the electrical harness, angular positioning of the secondary member according to a relative angular orientation; holding of the secondary member in position; and secondary contraction of the secondary shrink sleeve.

18 Claims, 5 Drawing Sheets

(51) Int. Cl.
*H01R 4/72* (2006.01)
*H01R 13/46* (2006.01)
*H01B 13/00* (2006.01)

(52) U.S. Cl.
CPC ............... *H01B 19/00* (2013.01); *H01R 4/72* (2013.01); *H01R 13/465* (2013.01)

(58) Field of Classification Search
CPC .... H01R 4/72; H01R 13/465; B60R 16/0207; H02G 3/0487
USPC ........................................................ 174/72 A
See application file for complete search history.

(56) References Cited

U.S. PATENT DOCUMENTS

| | | | | |
|---|---|---|---|---|
| 5,226,837 | A * | 7/1993 | Cinibulk | H01R 13/5216 439/936 |
| 5,945,635 | A | 8/1999 | Suzuki et al. | |
| 7,529,638 | B2 | 5/2009 | Sawai et al. | |
| 9,090,215 | B2 | 7/2015 | Oiwa et al. | |
| 11,084,433 | B2 * | 8/2021 | Kawase | B60R 16/0207 |
| 2003/0109171 | A1 * | 6/2003 | Morgan | H01B 11/02 439/502 |
| 2005/0106934 | A1 | 5/2005 | Hatori | |
| 2013/0233616 | A1 | 9/2013 | Okuyama et al. | |
| 2018/0082765 | A1 | 3/2018 | Endo et al. | |
| 2019/0267157 | A1 * | 8/2019 | Nakamura | H02G 1/145 |
| 2020/0111588 | A1 | 4/2020 | Yamamoto et al. | |

FOREIGN PATENT DOCUMENTS

| | | | |
|---|---|---|---|
| CN | 109217050 | * | 1/2019 |
| CN | 209550453 | U | 10/2019 |
| DE | 102012203571 | B3 | 4/2013 |
| EP | 9924713 | A1 | 6/1999 |
| EP | 3480909 | A1 | 5/2019 |
| FR | 2937471 | A1 | 4/2010 |
| JP | 2002343157 | A | 11/2002 |
| JP | 3959006 | A | 8/2007 |
| JP | 2015185322 | A | 10/2015 |
| WO | 2019234080 | A1 | 12/2019 |

OTHER PUBLICATIONS

Yang, Xin Robotic Assembly of Automotive Wire Harnesses. Jul. 1, 2014. 5 pages https://www.assemblymag.com/articles/92264-robotic-assembly-ofautomotive-wire-harnesses.

French Search Report for French Application No. FR2007329, Completed by the French Patent Office, dated Mar. 9, 2021, 10 pages.

* cited by examiner

METHOD FOR MANUFACTURING AN ELECTRICAL HARNESS

CROSS REFERENCE TO RELATED APPLICATIONS

This application claims priority to French patent application No. FR 20 07329 filed on Jul. 10, 2020, the disclosure of which is incorporated in its entirety by reference herein.

TECHNICAL FIELD

The present disclosure relates to the field of electrical harness manufacturing. Such electrical harnesses comprise at least one electric wire extending between at least two connectors. The electric wire or wires are also covered by at least one protective sheath helping protect the electric wire or wires from friction or any contact with a foreign object.

BACKGROUND

The connectors are intended to cooperate with electrical equipment or with other electrical harnesses and may be at least partially covered by shrink sleeves. Indeed, such shrink sleeves may be arranged so as to at least partially cover both an end of a protective sheath and a connector or so as to at least partially cover several portions of protective sheaths in the case of a branch joint. Once shrunk, these shrink sleeves seal these connections against dust and/or water.

Moreover, once the shrink sleeves have been shrunk during a contraction operation, for example a thermal contraction operation, or possibly during an operation for cross-linking an adhesive, a sealant or the like, the connectors and the at least one sheath are rigidly connected to each other. Therefore, the rotation of a connector relative to the longitudinal axis along which the at least one sheath extends may subject this sheath to torsional stress, and even plastic deformation when the shear stress exceeds a threshold value.

In the aeronautical field in general, such electrical harnesses are produced from a first physical prototype of a model electrical harness made directly on a model aircraft. Next, the model electrical harness is removed from the model aircraft and one or more specific tools are produced, such as counter-forms with which the model electrical harness cooperates in a complementary manner.

This type of specific tool is designed to hold the connectors during the phase of contracting the shrink sleeves, such that the connectors and/or the protective sheath are not deformed when the electrical harness is subsequently assembled on an aircraft. For this purpose, the tool has, at each of the connectors, a position and an orientation that are predetermined in advance, during the prototype phase.

This type of tool may form a sub-assembly, referred to a module, of a modular system used to manufacture a complete harness.

Generally, an operator arranges the different modules on a modular table in order to form a tooling system referred to, for convenience, as a “complete tool”, as opposed to the notion of a specific tool mentioned previously. The data sheet for manufacturing a harness lists the references of the different modules to be used and the respective locations where they need to be arranged on the modular table.

In particular, the modules constrain the relative angular orientation of the different connectors and the different branch joint sleeves relative to the longitudinal axis of the different branches of the electrical harness before the phase of contracting the shrink sleeves.

Such a complete tool makes it possible to process, in a single operation, all of the dimensional parameters of the electrical harness, such as, in particular, the length of the branches and the relative angular orientation of the connectors and the branch joint sleeves relative to the at least one protective sheath.

The angular values of the radial orientations of the connectors and the branch joint sleeves relative to the at least one protective sheath are not specified in the work document indicating the phases of manufacturing an electrical harness to the operator. Indeed, these angular values are defined and set by the different modules.

However, some modules may be specific to a particular type and orientation of connector or branch joint sleeve. The number of modules required may be considerable, depending on the number of different electrical connectors and branch joint sleeves to be positioned on the same electrical harness and the number of different electrical harnesses that can be manufactured for the same aircraft and/or for several different aircraft. This can give rise to problems in terms of storing and managing these different modules or in the case of specific complete tools that cannot be broken down into several modules.

Moreover, the time required to search for and position the various modules on the modular table is not insignificant. Similarly, once the manufacture of an electrical harness is complete, it may be necessary to remove all the modules from the modular table, identify them and store each one in a clearly marked location for possible future use.

Furthermore, such modules or specific complete tools also entail major financial costs associated with their development, design and production. Moreover, any modification in definition affecting the relative angular orientation of a connector in relation to a sheath entails modifying the module in question or the specific complete tool, which has an impact on the cost and the production cycle.

Finally, in the event of a problem assembling the electrical harness on an aircraft, it is not possible to determine the cause of the problem without removing the harness from the aircraft and without positioning it once more on the tool that acts as a template.

Documents JP 3 959 006 and U.S. Pat. No. 7,529,638 describe methods for manufacturing an electrical harness comprising at least three connectors and at least one branch joint with three branches. Such an electrical harness may then have three-dimensional geometry but is produced on a two-axis plane. Therefore, a manufacturing phase using a predetermined angle measured on this working plane is described.

However, a harness is manufactured flat with this predetermined angle between the three branches; the orientation of the different connectors relative to each sheath section can then be modified during the subsequent assembly by the other, differently oriented protective sheath sections. Shear stress generated by torsional stresses may therefore occur in the different branches on the protective sheath and/or on the connectors and the branch joints.

Document U.S. Pat. No. 9,090,215 relates to an electrical harness comprising a branch joint with three branches for orienting wires in a single predetermined relative orientation.

Document WO 2019/234080 relates to a tool (1) for modularly overmolding a cable strand (10) in order to produce a protective sheath along the entire length of the strand and thus form a harness. This tool (1) comprises complementary half-modules (2*a*; 3*a*; 4*a*) assembled into standard modules (2) and into branch joint modules extending respectively in the same median plane (PM) and, in suitable cases, in a direction (Z 'Z) outside this median plane (PM), the half-modules (2a; 3a; 4a) being in the overall shape of straight and angled blocks. Each half-module (2a; 3a; 4a) has an inner half-bore (9) forming, with the half-bore of the complementary half-module, a cylindrical bore surrounding the strand (10) along straight and angled sections (9), and a cylindrical double bore (9; 93D) along sections of the strand (10) forming a branch joint (11). The adjacent half-modules (2a; 3a; 4a) of consecutive modules are coupled together by contiguous, detachable mechanical connections (7a; 7b).

This document WO 2019/234080 also describes a method for manufacturing an electrical harness comprising at least one electric wire and at least one protective sheath. Such a method comprises a step of injecting a primary sheathing material into the tool in order to fill the gap between the bore (9) of the overmolding modules and the strand (10). The method then comprises a step of heat treatment of the primary material in order to form the protective sheath.

Therefore, such a method makes it possible to shape the harness three-dimensionally, i.e., to produce bends or branch joints with predetermined angles for the different branches.

However, such a method does not allow the connectors and the branch joints to be oriented according to a twist angle of each branch, in particular at straight connectors.

Document FR 2 937 471 describes an electrical harness for an aircraft comprising a sealing sheath (40) arranged around an end zone (20') of a metal braid (20) and a clamping collar (50).

Furthermore, in order to manufacture harnesses, the use of methods as described in documents EP 0 924 713, EP 3 480 909 or the article "Robotic Assembly of Automotive Wire Harnesses" published by Xin Yang on 1 Jul. 2014 and available on the website https://www.assemblymag.com/articles/92264-robotic-assembly-ofautomotive-wire-harnesses, is also known. Although these methods may comprise steps for immobilizing a connector or producing a seal, they do not make it possible to eliminate the torsional stresses in the sheaths, these stresses being generated when assembling the harness on an aircraft when the angular orientation of a connector, for example a female connector, does not match the angular orientation of a complementary male connector.

SUMMARY

The object of the present disclosure is therefore to propose an alternative manufacturing method that helps overcome the above-mentioned limitations. Moreover, such a manufacturing method can make it possible to dispense with the need for many different modules, or even a modular table for manufacturing different electrical harnesses. It also immobilizing helps limit, or indeed ensure the absence, of any torsional stress generated during the assembly of the electrical harness in the protective sheath or sheaths, the branch joints and/or the connectors.

The disclosure therefore relates to a method for manufacturing an electrical harness, this electrical harness comprising at least one reference member and at least one secondary member and at least one electric wire extending between the at least one reference member and the at least one secondary member. The harness comprises at least one protective sheath for protecting the at least one electric wire and at least two shrink sleeves, the at least two shrink sleeves comprising at least one reference shrink sleeve and at least one secondary shrink sleeve, the at least one reference shrink sleeve being arranged so as to at least partially cover the at least one reference member and the at least one protective sheath, the at least one secondary shrink sleeve being arranged so as to at least partially cover the at least one secondary member and the at least one protective sheath.

According to the disclosure, such a method is remarkable in that it comprises at least the following steps:

assembling of the at least one electric wire, the at least one protective sheath, the at least two shrink sleeves, the at least one reference member and the at least one secondary member, the at least two shrink sleeves being arranged in a non-contracted state;

in a reference portion of the electrical harness, reference contraction of the at least one reference shrink sleeve, the reference contraction step allowing the at least one protective sheath to be immobilized relative to said at least one reference member, the at least one reference member allowing the electrical harness to be assigned at least one reference plane;

in a secondary portion of the electrical harness different from the reference portion, angular positioning of the at least one secondary member relative to the reference plane according to a relative angular orientation, the relative angular orientation being defined in a plane perpendicular to a longitudinal direction OX along which the at least one protective sheath extends longitudinally opposite the at least one secondary member;

holding of the at least one secondary member in position in the relative angular orientation; and secondary contraction of the at least one secondary shrink sleeve.

In other words, such a manufacturing method is applicable to any electrical harness comprising two connectors or more when this harness has branch joints. The reference member and the secondary member may be chosen indiscriminately from the group comprising the connectors and the branch joints.

The expression "shrink sleeve" may refer indiscriminately to a heat-shrink sleeve or any other type of sleeve for producing a seal at a connection between a reference member or a secondary member and a protective sheath. A shrink sleeve may thus comprise a sleeve secured by a bonding method by means of a bonding agent such as an adhesive or a sealant interposed between this sleeve, the reference or secondary member and the protective sheath. Another type of shrink sleeve may also be clamped mechanically onto the reference or secondary member and the protective sheath, such as a cable gland, for example.

The reference contraction of a shrink sleeve so as to at least partially cover the reference member and the at least one sheath helps constrain the reference member and the at least one protective sheath in rotation. The positioning of this reference member thus allows a reference plane of the electrical harness to be identified.

When the reference member is a straight connector, the reference plane may be defined as being a plane perpendicular to a radial direction passing, for example, through a key or a locating pin of the connector.

When the reference member is an angled connector, the reference plane may be defined as being a plane perpendicular to a radial direction passing through the bend of the connector or indeed as being a plane perpendicular to a projection of this radial direction passing through the bend on a transverse plane YOZ.

Finally, when the reference member is a branch joint, the reference plane may be defined as being a plane in which coplanar branches of the branch joint lie.

Such a manufacturing method therefore comprises one or more contraction steps referred to for convenience as "reference contraction" steps in order to be easily distinguished from one or more other contraction steps referred to for convenience as "secondary contraction" steps. Moreover, the expressions "reference contraction" and "secondary contraction" may consist in heating, bonding, sealing or indeed mechanically clamping a shrink sleeve comprising a cable gland onto the reference or secondary member and the protective sheath. These different contraction steps thus help provide tight sealing at the connections between a protective sheath and the reference or secondary member.

Such contraction steps are thus carried out in sequence one after another precisely in order, starting with a reference contraction followed by at least one secondary contraction.

Depending on information relating to relative angular orientations contained in a definition drawing of the electrical harness to be manufactured, an operator may then orient a secondary member such as, for example, a connector in the secondary portion of the electrical harness, relative to the protective sheath arranged opposite and therefore relative to the reference plane previously defined in the reference portion of the electrical harness.

As already indicated, the reference contraction and secondary contraction steps may, for example, be carried out by heating the shrink sleeves by means of a heating device, for example using an electrical resistance and a fan to generate a flow of air passing close to the heating resistance then conveyed towards a shrink sleeve.

The angular positioning and the holding of the at least one secondary member in position may be achieved in different ways, for example manually by an operator or by means of a tool capable of orienting the secondary member in a relative angular position of between 0 and 360 degrees around the longitudinal direction OX of the protective sheath. Such a relative angular position allows a specific twist angle to be defined for each branch or for each connector that may, in particular, have a locating pin.

Moreover, the relative angular orientation between the at least one secondary member and the reference plane may advantageously be read or noted by the operator in the definition drawing of the electrical harness to be manufactured. Pour each secondary member and each relative angular orientation, the operator may use a single tool in order to orient each secondary member in a different manner, one after another.

Advantageously, the method may comprise a preliminary step of determining the relative angular orientation.

Such a preliminary step may therefore be implemented in order to generate a definition drawing of the electrical harness and allow the operator to read or note the different relative angular orientation values to subsequently be given to at least one secondary member.

Such a preliminary step may moreover be implemented in different ways and, for example, by a simulation, tests, trials or calculations.

In practice, this preliminary step may be carried out by manufacturing a model electrical harness directly on a model aircraft, the model electrical harness being different from the electrical harness and comprising at least one model secondary member, at least one model reference member, at least one model electric wire extending between the at least one model secondary member and the at least one model reference member, at least one model protective sheath for protecting the at least one model electric wire and at least two model shrink sleeves, the at least two model shrink sleeves comprising at least one model reference shrink sleeve and at least one model secondary shrink sleeve, the at least one model reference shrink sleeve being arranged so as to at least partially cover the at least one model reference member and the at least one model protective sheath, the at least one model secondary shrink sleeve being arranged so as to at least partially cover the at least one model secondary member and the at least one model protective sheath.

In other words, the model electrical harness is a different electrical harness to that which is manufactured using the manufacturing method, but is dimensionally and structurally identical. The model electrical harness is manufactured prior to the electrical harnesses and allows an operator to produce a definition drawing of the electrical harnesses to subsequently be manufactured.

Moreover, this preliminary step may comprise the following sub-steps:

marking of a reference line on the at least one model protective sheath by means of marks arranged on the at least one model protective sheath;

preliminary assembling of the at least one model electric wire, the at least one model protective sheath, the at least two model shrink sleeves, the at least one model secondary member and the at least one model reference member, the at least two model shrink sleeves being arranged in a non-contracted state, the preliminary assembling sub-step being carried out on a working plane;

in a model reference portion of the model electrical harness, preliminary reference contraction allowing a model reference plane to be assigned to the model electrical harness, the model reference plane being defined by means of the marks arranged on the at least one model sheath;

positioning of the model electrical harness on the model aircraft and connection of at least one model secondary member with at least one piece of electrical equipment of the model aircraft;

in a model secondary portion of the model electrical harness different from the model reference portion, preliminary secondary contraction of the at least one model secondary shrink sleeve; and measuring of the relative angular orientation between the marks arranged on the at least one model protective sheath and the at least one model secondary member.

In other words, the marking sub-step makes it possible to identify a straight orientation on the at least one model protective sheath. This marking may, for example, be achieved by adding marks to a standard sheath or indeed by using a sheath pre-equipped with such a reference line.

The model reference member is then oriented angularly relative to the sheath in order to define the model reference plane in the model reference portion.

In the model secondary portion, the model secondary member and the model protective sheath are then still free to pivot relative to each other and, therefore, no torsional stress is transmitted to the at least one model protective sheath.

Once the preliminary reference contraction has been carried out, the model protective sheath is immobilized relative to the model reference member and also relative to the model secondary member that is mounted on a piece of electrical equipment of the model aircraft. The preliminary secondary contraction therefore allows the relative angular orientation to be set between this model secondary member and the at least one model protective sheath. It is then optionally possible to disconnect the model secondary member from the electrical equipment.

According to a first embodiment of the disclosure, the sub-step of measuring the relative angular orientation may be implemented with the model electrical harness being left fully mounted on the model aircraft.

Indeed, a measuring tool may be used directly on the model aircraft in order to record the different angular orientations. Such a measuring sub-step then allows an operator to take a quick reading and allows the model electrical harness to then be used directly on the model aircraft. Only the model secondary member or members may be temporarily disconnected from the electrical equipment in order to carry out this measuring sub-step.

According to a second embodiment of the disclosure, the preliminary step may comprise a sub-step of removing the model electrical harness from the model aircraft, the sub-step of measuring the relative angular orientation being implemented after the removal sub-step.

In this scenario, the sub-step of removing the model electrical harness may allow an operator to carry out the measuring sub-step outside the model aircraft and therefore to measure relative angular orientations that are difficult to access, or even impossible to achieve, when the model electrical harness is mounted on the model aircraft.

Moreover, the at least one reference member may take several forms.

According to a first variant of the disclosure, the at least one reference member may comprise a reference connector, the at least one reference plane corresponding to a plane defined as a function of a position of the reference connector.

The position of the reference connector is determined by means of a reference relative angular orientation in relation to the at least one protective sheath. For example, the reference connector being substantially cylindrical and straight, a key or a locating pin provided on or in the reference connector thus makes it possible to identify its position prior to the reference contraction. Such a locating pin is therefore offset radially relative to a central axis of the reference connector.

According to another example, the reference connector may be angled at 90 degrees. In this case, the angular orientation of the bend in azimuth relative to the longitudinal direction OX of the protective sheath makes it possible to identify the orientation of the reference plane relative to this bend.

According to a second variant of the disclosure, the at least one reference member may comprise at least one branch joint with three branches, the at least one reference plane corresponding to a plane containing the three branches of the at least one branch joint with three branches.

In other words, the three branches of a branch joint are oriented in three coplanar directions defining the reference plane.

Moreover, the at least one reference member may comprise two branch joints with three branches comprising a first branch joint and a second branch joint, the at least one reference plane comprising a first reference plane and a second reference plane, the at least one reference shrink sleeve comprising a first reference shrink sleeve and a second reference shrink sleeve, the first reference shrink sleeve being arranged so as to at least partially cover at least one of the three branches of the first branch joint and the at least one protective sheath, the second reference shrink sleeve being arranged so as to at least partially cover at least one of the three branches of the second branch joint and the at least one protective sheath.

More specifically, the first and second reference shrink sleeves may respectively form two single-piece assemblies simultaneously covering the three branches of the first branch joint and the second branch joint. Two reference contraction steps are carried out in this scenario and allow a first reference plane then a second reference plane to be assigned to the different sections of the electrical harness.

The two reference contraction steps are carried out in a precise order that may, for example, be defined from left to right on a production drawing of the electrical harness.

Once the first reference contraction has been carried out on the reference shrink sleeve, two secondary contraction steps can be carried out on two secondary shrink sleeves cooperating with two protective sheaths. The third branch of the first branch joint cooperates with a first end of an intermediate protective sheath. The second end of this intermediate protective sheath cooperates with one of the three branches of the second branch joint.

In this case, the step of contracting the shrink sleeve arranged at the second branch joint is both a secondary contraction step with respect to the first reference step and a second reference step with respect to the other branches each cooperating with a secondary member formed by a connector.

Therefore, this second reference contraction step is then followed by two steps for angularly positioning the two secondary members relative to two protective sheaths, two steps for holding these secondary members and the protective sheaths in position and two secondary contraction steps for contracting the two secondary shrink sleeves that remain in a non-contracted state at the final two secondary members.

The object of the present disclosure is also a tool configured to at least angularly position and hold in position at least one secondary member relative to at least one protective sheath according to a relative angular orientation and to help manufacture an electrical harness according to the abovementioned method.

Such a tool may also be used to take the measurements of the relative angular orientation of the different secondary members of a model electrical harness. This tool also makes it possible to check the relative angular orientations once the electrical harness has been manufactured. Such a check may be advantageous, in particular, before assembling the electrical harness on an aircraft or during assembly if a problem is identified.

Moreover, such a tool may be used to check a relative angular orientation once the electrical harness is totally assembled on an aircraft without it needing to be removed from the aircraft.

Advantageously, such a tool may comprise:

a planar fixed plate;

at least one immobilizing device for immobilizing a protective sheath of the electrical harness and securing the protective sheath to the fixed plate;

a rotationally movable part that is able to rotate about an axis of rotation, the axis of rotation being arranged parallel to the fixed plate;

at least one immobilization support configured to immobilize the secondary member of an electrical harness and secure said secondary member with the movable part; and a graduated angular scale for positioning the protective sheath and the secondary member according to the relative angular orientation.

The rotationally movable part thus allows a secondary member to be pivoted relative to the axis of rotation lying in the reference plane.

The reference plane is arranged parallel to the fixed plate of the tool.

In practice, the tool may comprise an angular locking means for locking the movable part in position relative to the fixed plate.

The secondary member is therefore held in angular position by means of this angular locking means. Such an angular locking means may, for example, comprise an indexing pin, a clamping piston, a ratchet device, etc.

According to another example, the tool may comprise at least one guide bearing for guiding the movable part in rotation relative to the fixed plate.

This or these guide bearings make it possible, in particular, to reduce the friction between the movable part and the fixed plate when the movable part is rotating.

Advantageously, the tool may comprise a fixed disk secured to the fixed plate, the fixed disk comprising, in order to indicate the relative angular orientation, either the graduated angular scale or a radial index intended to be arranged opposite the graduated angular scale.

In other words, the graduated angular scale or the radial index may be arranged on the fixed disk in order to allow an operator at least to position the secondary member according to the relative angular orientation.

Alternatively, or in addition, the movable part may comprise a movable disk comprising, in order to indicate the relative angular orientation, either said graduated angular scale or a radial index intended to be arranged opposite the graduated angular scale.

In this scenario, the axis of rotation of the movable disk coincides with an axis of revolution of the fixed disk. The rotation of the movable disk allows the radial index or the graduated angular scale to move respectively relative to the graduated angular scale or to the radial index.

In practice, the movable part may comprise a movable plate, the at least one immobilization support being mounted on the movable plate.

The positioning of such a movable plate on a movable disk may be adjustable in the plane defined by the movable disk. Such a movable plate may make it possible, for example, to adapt the position of an immobilization support depending on the type of secondary member to be immobilized.

The movable plate can also be retractable relative to the movable disk, for example in order to replace an immobilization support depending on the type of secondary member to be immobilized. Reversible securing means such as screws and/or nuts or a ball-and-spring locking system then allow the movable plate to be removed quickly.

Moreover, the fixed disk and the movable disk each have a through-hole allowing the secondary member and/or the protective sheath to pass through the tool.

BRIEF DESCRIPTION OF THE DRAWINGS

The disclosure and its advantages appear in greater detail from the following description of examples given by way of illustration with reference to the accompanying figures, in which.

DETAILED DESCRIPTION

As mentioned above, the disclosure relates to a method for manufacturing an electrical harness intended, for example, to equip an aircraft. The disclosure can also relate to a method for manufacturing an electrical harness in fields other than the aeronautics field.

Elements present in more than one of the figures may, if appropriate, be given the same references in each of them.

Figure 1:
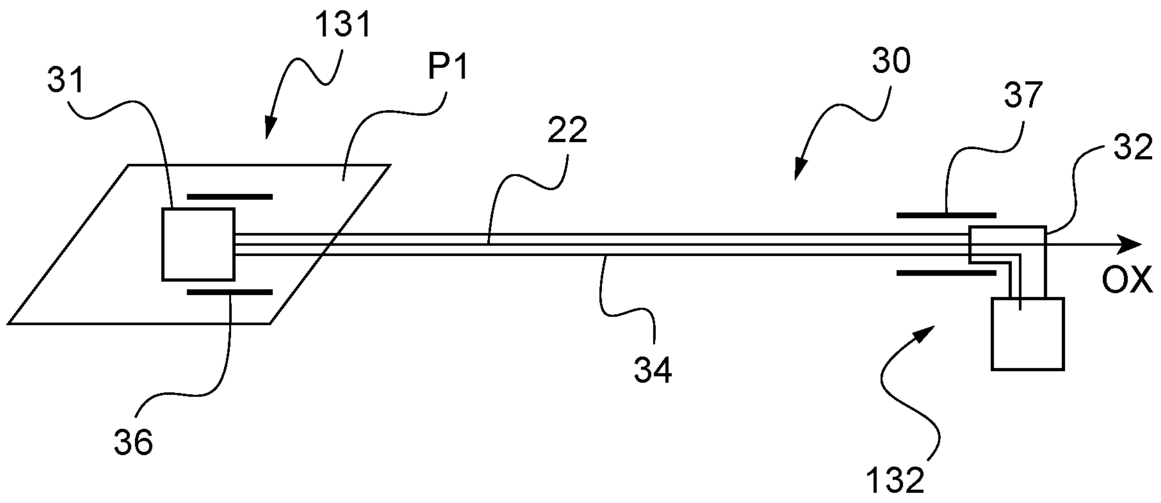
FIG. 1 is a perspective view of a first embodiment of an electrical harness manufactured according to a manufacturing method according to the disclosure.

As shown in FIG. 1, such an electrical harness 30 comprises at least one electric wire 22 extending between a reference member 31 formed in this example by a straight connector and a secondary member 32 formed by an 90° angled connector in this variant of the first embodiment of an electrical harness 30.

Such an electric wire 22 is moreover protected by a protective sheath 34. A first end of this protective sheath 34 cooperates with the reference member 31 in a reference portion 131. A second end of the protective sheath 34 cooperates with the secondary member 32 in a secondary portion 132.

In order to tightly seal such an electrical harness 30, shrink sleeves 36, 37 are also used and shown in FIG. 1 in a non-contracted state. Thus, in a reference portion 131, a reference shrink sleeve 36 is positioned so as to partially cover the reference member 31 and the protective sheath 34. Similarly, in a secondary portion 132, a secondary sleeve 37 is positioned so as to partially cover the secondary member 32 and the protective sheath 34.

A reference contraction is then carried out on the reference shrink sleeve 36, for example by heating the reference shrink sleeve 36, in order to thermally shrink it and thus immobilize the protective sheath 34 relative to the reference member 31. Therefore, this operation allows a reference plane P1 to be defined. Such a reference plane P1 is oriented in this instance perpendicular to a radial direction connected to the orientation of the reference member 31.

The secondary member 32 is then capable of pivoting about a longitudinal direction OX by a relative angular orientation θ1 relative to the protective sheath 34, and therefore relative to the reference plane P1 that was previously assigned to it in the reference portion 131.

Once oriented, the secondary member 32 and the protective sheath 34 are then held in position and a secondary contraction may be carried out on the secondary shrink sleeve 37, for example by heating the secondary shrink sleeve 37 in order to shrink the secondary shrink sleeve 37, so as to immobilize the secondary member 32 relative to the protective sheath 34 and to the reference plane P1.

Figure 2:
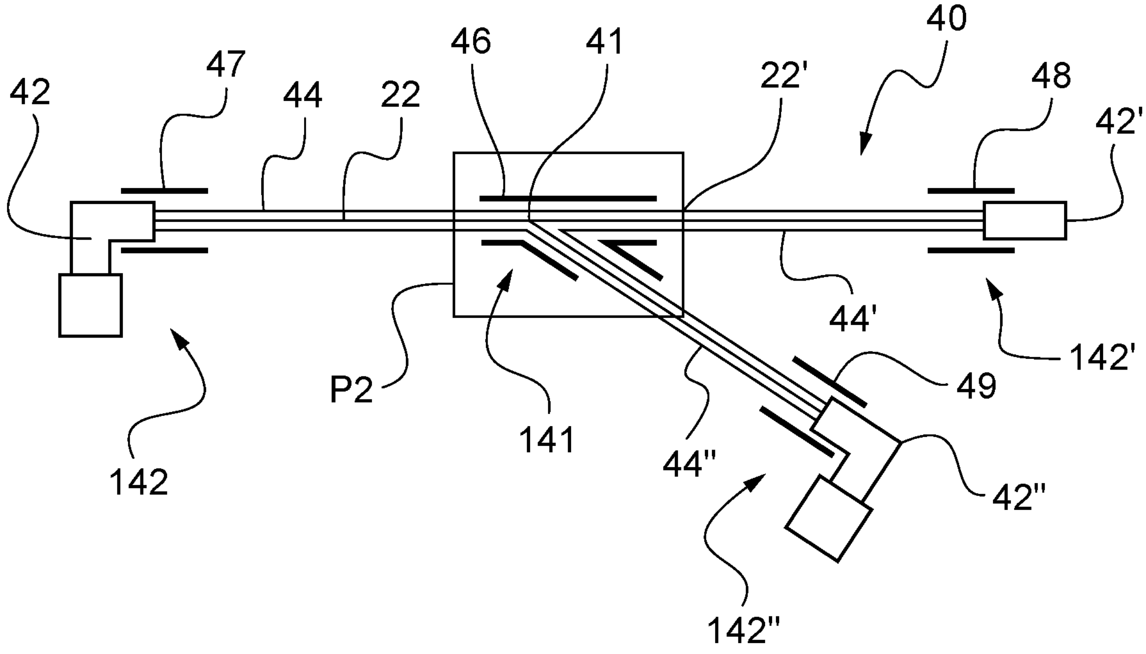
FIG. 2 is a top view of a second embodiment of an electrical harness manufactured according to the manufacturing method according to the disclosure.

As shown in FIG. 2, an electrical harness 40 according to a second embodiment comprises at least one electric wire 22, 22' extending between a reference member 41 formed, in this example, by a branch joint with three coplanar branches and three secondary members 42, 42', 42" formed by straight or angled connectors.

Such an electric wire 22, 22' is moreover protected by three sections of the protective sheath 44, 44', 44". A first end of each protective sheath 44, 44', 44" cooperates with the reference member 41 in a reference portion 141. A second end of the protective sheath 44, 44', 44" cooperates with each secondary member 42, 42', 42" in a secondary portion 142, 142', 142".

As above, shrink sleeves 46, 47, 48, 49 are also positioned on this electrical harness 40 in a non-contracted state. Thus, in a reference portion 141, a reference shrink sleeve 46 is arranged so as to partially cover the reference member 41 and the protective sheath 44, 44', 44". Similarly, in the three secondary portions 142, 142', 142", secondary sleeves 47, 48, 49 are arranged so as to partially cover the three secondary members 42, 42', 42" and the three sections of the protective sheath 44, 44', 44".

A reference contraction is then carried out by heating the reference shrink sleeve 46 in order to immobilize each section of the protective sheath 44, 44', 44" relative to the reference member 41. A reference plane P2 is thus defined depending on the position of the three branches of the branch joint forming the reference member 41.

Each secondary member 42, 42', 42" is then capable of pivoting about a longitudinal direction OX by a relative angular orientation θ1 in relation to the associated section of the protective sheath 44, 44', 44" and therefore in relation to the reference plane P2 that was previously assigned to it in the reference portion 141.

Once oriented, these secondary members 42, 42', 42" and respectively the sections of the protective sheath 44, 44', 44" are then held in position and secondary contractions may be carried out on the secondary shrink sleeves 47, 48, 49.

Figure 3:
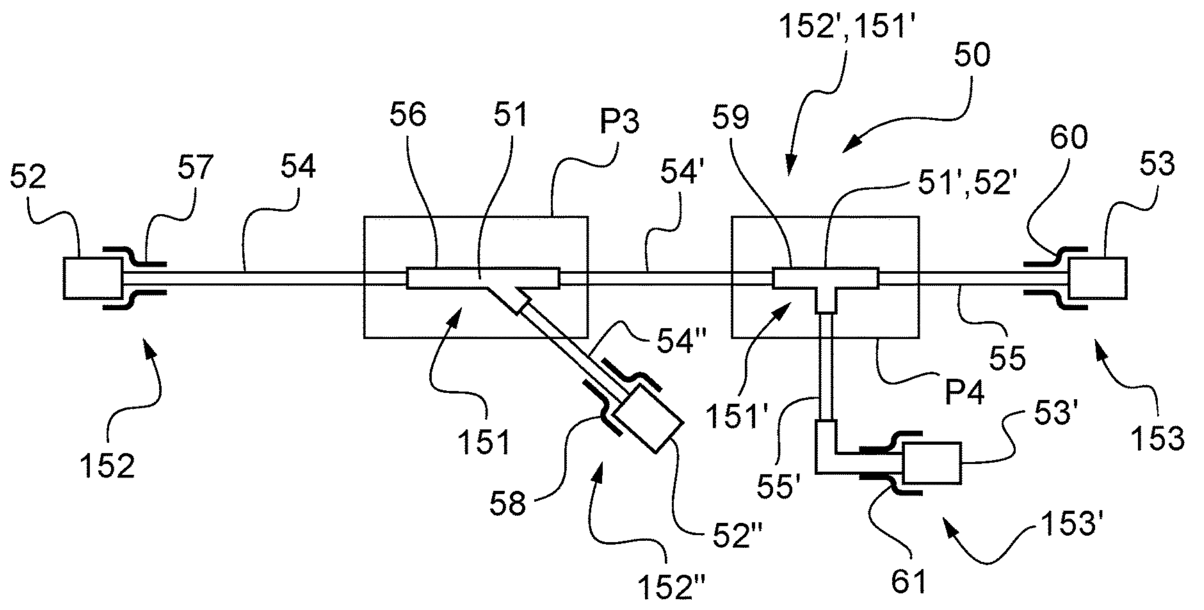
FIG. 3 is a perspective view of a third embodiment of an electrical harness manufactured according to the manufacturing method according to the disclosure.

Similarly, and as shown in FIG. 3, a third embodiment of an electrical harness 50 may also comprise several reference members 51, 51' formed in this example by two branch joints with three coplanar branches and five secondary members 52, 52', 52", 53, 53'. Moreover, the reference member 51' and the secondary member 52' are in this instance combined. The secondary members 52, 52", 53 and 53" are formed by straight or 90° angled connectors, for example.

Five sections of the protective sheath 54, 54', 54", 55 and 55' protect the electric wires of the electrical harness 50. A first reference member 51 is arranged in a first reference portion 151. A second reference member 51' is arranged in a second reference portion 151'.

As above, the shrink sleeves 56, 57, 58, 59, 60, 61 are positioned on this electrical harness 50 in a non-contracted state. Thus, in the reference portion 151, a first reference shrink sleeve 56 is arranged so as to partially cover the reference member 51 and the protective sheath 54, 54', 54". Similarly, in the three secondary portions 152, 152', 152", first secondary sleeves 57, 58, 59 are arranged so as to partially cover the three first secondary members 52, 52', 52" and the three sections of the protective sheath 54, 54', 54".

A first reference contraction is then carried out by heating the first reference shrink sleeve 56, immobilizing each section of the protective sheath 54, 54', 54" with respect to the first reference member 51 and thus defining a first reference plane P3 depending on a position of the three branches of the branch joint forming the first reference member 51.

Each first secondary member 52, 52', 52" is then capable of pivoting about a longitudinal direction OX by a relative angular orientation θ1 relative to each section of the protective sheath 54, 54', 54" and therefore relative to the first reference plane P3 that was previously assigned to it in the first reference portion 151.

Once oriented, these first secondary members 52, 52', 52" and respectively the sections of the protective sheath 54, 54', 54" are then held in position and first secondary contractions may be carried out on the first secondary shrink sleeves 57, 58, 59.

The first secondary shrink sleeve 59 then also forms a second reference shrink sleeve 59. A second reference contraction is then carried out, immobilizing each section of the protective sheath 55, 55' with respect to the second reference member 51' combined with the first secondary member 52'. A second reference plane P4 is thus defined depending on the position of the three branches of the branch joint forming the second reference member 51'.

Each second secondary member 53, 53' is then capable of pivoting about a longitudinal direction OX by a relative angular orientation θ1 relative to the associated section of the protective sheath 55, 55' and therefore relative to the second reference plane P4 that was previously assigned to it in the second reference portion 151'.

Once oriented, these secondary members 52, 52', 52" and respectively the sections of the protective sheath 54, 54', 54" are then held in position and second secondary contractions may be carried out on the second secondary shrink sleeves 60, 61.

The different shrink sleeves 56-61 are shown here in their contracted state to ensure the electrical harness 50 is tightly sealed.

Figure 4:
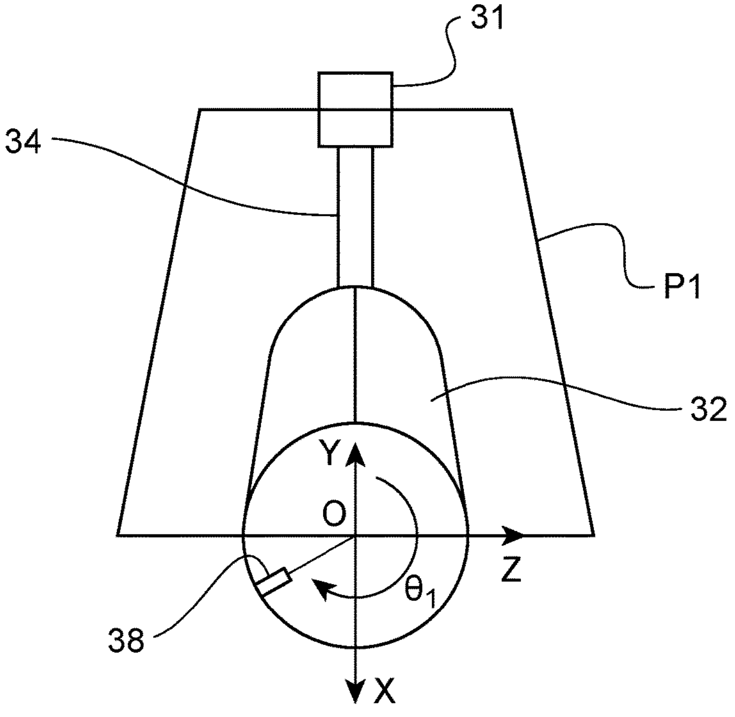
FIG. 4 is another perspective view of a variant of the first embodiment of an electrical harness manufactured according to the manufacturing method according to the disclosure.

As shown in FIG. 4, the relative angular orientation θ1 may, for example, be read conventionally in the clockwise direction relative to a transverse direction OY perpendicular to the longitudinal direction OX. The relative angular orientation θ1 is then read in a transverse plane YOZ defined by two transverse directions OY and OZ perpendicular to each other and relative to the longitudinal direction OX.

Such a transverse plane YOZ is also arranged perpendicular to the reference plane P1 defined at the reference member 31.

Figure 5:
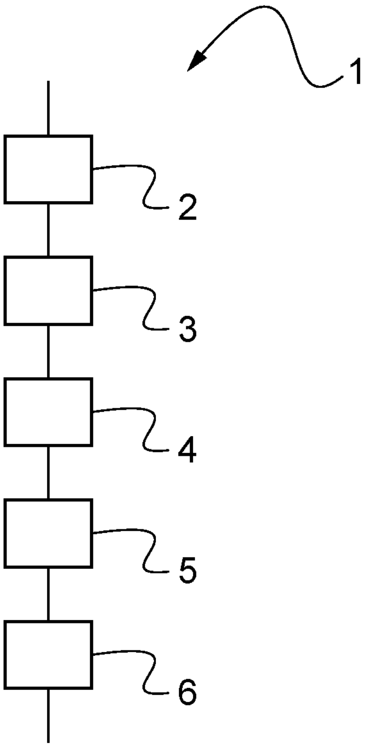
FIG. 5 is a logic diagram showing a first variant of the manufacturing method according to the disclosure.
Figure 6:
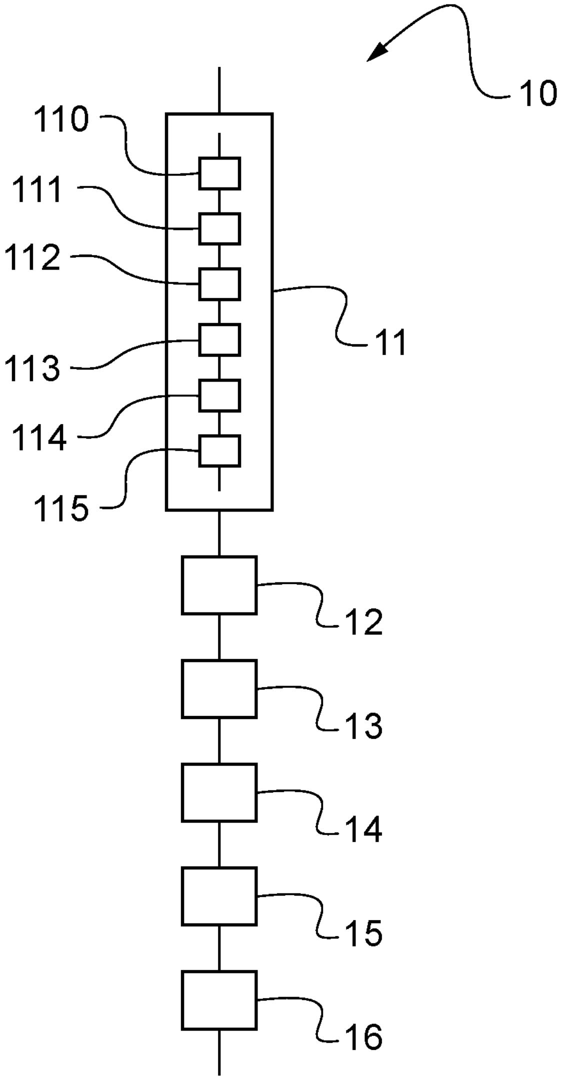
FIG. 6 is a logic diagram showing a second variant of the manufacturing method according to the disclosure.

As shown in FIGS. 5 and 6, such an electrical harness is manufactured by implementing a specific manufacturing method 1, 10.

According to a first variant of the manufacturing method shown in FIG. 5, the method 1 comprises a step 2 of assembling the electric wire or wires 22, 22', the at least one protective sheath 34, 44, 44', 44", 54, 54', 54", 55, 55', the at least two shrink sleeves 36-37, 46-49, 56-61, the at least one reference member 31, 41, 51, 51' and the at least one secondary member 32, 42, 42', 42", 52, 52', 52", 53, 53'.

During this assembly step 2, the at least two shrink sleeves 36-37, 46-49, 56-61 remain arranged in a non-contracted state.

Next, in a reference portion 131, 141, 151, 151' of the electrical harness 30, 40, 50, a reference contraction step 3 is carried out on a reference shrink sleeve 36, 46, 56, 59. Such a reference contraction step 3 thus allows the electrical harness 30, 40, 50 to be assigned at least one reference plane P1, P2, P3, P4. Moreover, the reference portion 151' may be defined at a later stage, namely after a first reference contraction step 3. The reference shrink sleeve will therefore be contracted during a second reference contraction step 3.

Thus, the reference plane P4 can be determined once the reference plane P3 has been assigned.

Therefore, in the secondary portion or portions 132, 142, 142', 142", 152, 152' 152", 153, 153' of the electrical harness 30, 40, 50 relative to the reference portion 131, 141, 151, 151', one or more steps 4 are implemented in order to angularly position the secondary member or members 32, 42, 42', 42", 52, 52', 52", 53, 53' relative to the at least one protective sheath 34, 44, 44', 44", 54, 54', 54", 55, 55' and therefore relative to a reference plane P1, P2, P3, P4.

As indicated above, the secondary portion or portions 153, 153' of the electrical harness 50 can only be assigned at a later stage after having determined the reference plane P4 at the reference portion 151'. Thus, the steps 4 of angularly positioning the secondary members 53, 53' relative to the portions of the protective sheath 55 and 55' are also carried out once the reference plane P4 has been allocated to the electrical harness 50.

Such an angular positioning 4 is carried out according to the relative angular orientation θ1 as described in FIG. 4 in the transverse plane YOZ perpendicular to a longitudinal direction OX along which the protective sheath 34, 44, 44', 44", 54, 54', 54", 55, 55' extends longitudinally.

For example, in this variant, a key or a locating pin 38 of the secondary member 32 is initially assembled during the assembly step 2 in a vertical position matching the transverse direction OY. The angular positioning step 4 then consists in rotating a secondary member 32, 42, 42', 42", 52, 52', 52", 53, 53' on itself about the longitudinal direction OX in order to position the locating pin 38, the bend of an angled connector when the secondary member 32, 42, 42', 42", 52, 52', 52", 53, 53' is formed by an angled connector 32, 42, 42", 53' or indeed the plane defined by the branches of a branch joint when the secondary member 32, 42, 42', 42", 52, 52', 52", 53, 53' is formed by a branch joint 52'.

Such a bend is therefore formed by a portion of the connector extending radially relative to the longitudinal direction OX. This bend may, for example, be oriented at an angle of 90° relative to the longitudinal direction OX, but other values may also be envisaged for this angle. In this case, the relative angular orientation θ1 is then assigned to a projection of the bend in a plane perpendicular to the longitudinal direction OX.

The manufacturing method 1 then comprises a step 5 of holding the secondary member 32, 42, 42', 42", 52, 52', 52", 53, 53' in position in the relative angular orientation θ1.

Finally, a secondary contraction step 6 is carried out on the secondary shrink sleeves 32, 42, 42', 42", 52, 52', 52", 53, 53'.

Figure 8:
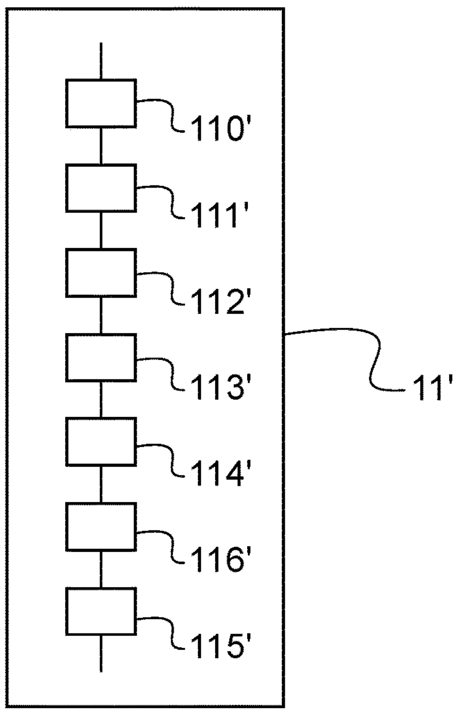
FIG. 8, is a diagram showing another example of a preliminary step of the manufacturing method according to the disclosure.

According to a second variant of the manufacturing method shown in FIGS. 6 and 8, the method 10 may comprise a preliminary step 11, 11' of determining the relative angular orientation θ1. This preliminary step 11, 11' is thus implemented prior to the assembly step 12, the reference contraction step 13, the angular positioning step 14, the step 15 of holding in position and the secondary contraction step 16. The preliminary step 11, 11' therefore consists in manufacturing a model electrical harness 230 on a model aircraft. This model electrical harness 230 is identical to the electrical harness 30, 40, 50 that needs to be manufactured according to the manufacturing method 1, 10.

Figure 7:
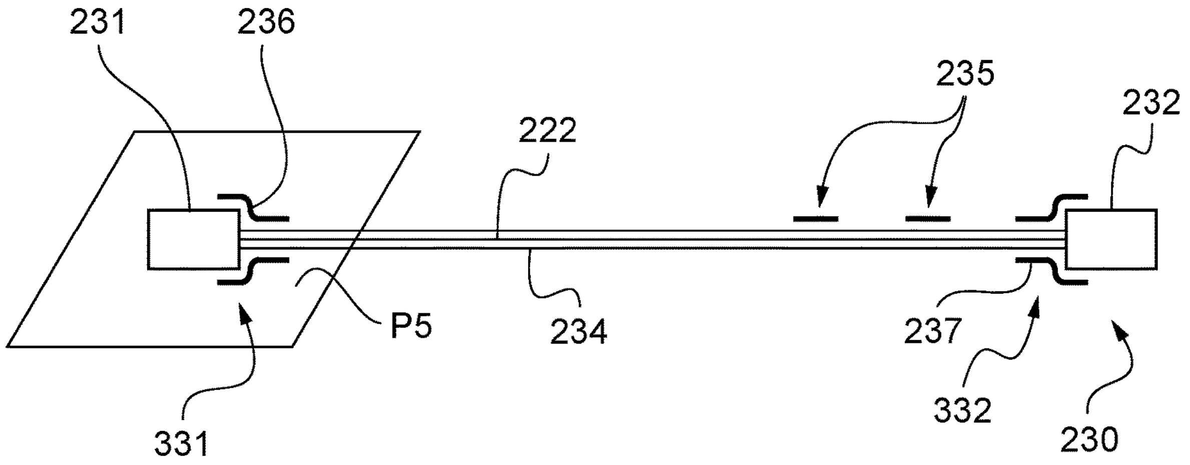
FIG. 7 is a perspective view of a model electrical harness manufactured in a preliminary step of the manufacturing method according to the disclosure.

This preliminary step 11, 11' comprises a sub-step 110, 110' of marking a reference line on a model protective sheath 234 as shown in FIG. 7. This marking step 110, 100' is carried out by means of marks 235 arranged on this model protective sheath 234.

The preliminary step 11, 11' next comprises a preliminary sub-step 111, 111' of assembling a model electric wire 222, the model protective sheath 234, two model shrink sleeves 236, 237, a model reference member 231 and a model secondary member 232. During this preliminary sub-step 111, 111', the two model shrink sleeves 236, 237 are arranged in their non-contracted state. Such a preliminary assembling sub-step 111, 111' is moreover carried out on a working plane.

The preliminary step 11, 11' then comprises a preliminary reference contraction sub-step 112, 112' for assigning a model reference plane P5 to the model electrical harness 230. This preliminary reference contraction sub-step 112, 112' is also carried out on the working plane in a model reference portion 331 of the model electrical harness 230. Moreover, such a model reference plane P5 is defined by means of the marks 235 arranged on the model protective sheath 234.

Therefore, only the model shrink sleeve 236 is arranged in its contracted state, whereas the model shrink sleeve 237 remains arranged in its non-contracted state.

The preliminary step 11, 11' next comprises a sub-step 113, 113' of positioning the model electrical harness 230 on the model aircraft and connecting the model secondary member 232 formed by a connector with at least one piece of electrical equipment of the model aircraft.

In a model secondary portion 332 of the model electrical harness 230 different from the model reference portion 331, a preliminary secondary contraction sub-step 114, 114' is next carried out on the model secondary shrink sleeve 237, followed by a sub-step 115, 115' of measuring the relative angular orientation θ1 between the marks 235 and the model secondary member 232.

Such a measuring sub-step 115, 115' may be implemented in different ways.

For example, as shown in FIG. 6, this sub-step 115 of measuring the relative angular orientation θ1 may be implemented with the model electrical harness 230 being left fully mounted on the model aircraft. Optionally, only the model secondary member 232 may be temporarily disconnected from the electrical equipment with which it cooperates.

Alternatively, and as shown in FIG. 8, the preliminary step 11' may comprise a sub-step 116' of removing the model electrical harness 230 from the model aircraft. The sub-step 115' of measuring the relative angular orientation θ1 is then implemented after the removal sub-step 116'.

Figure 9:
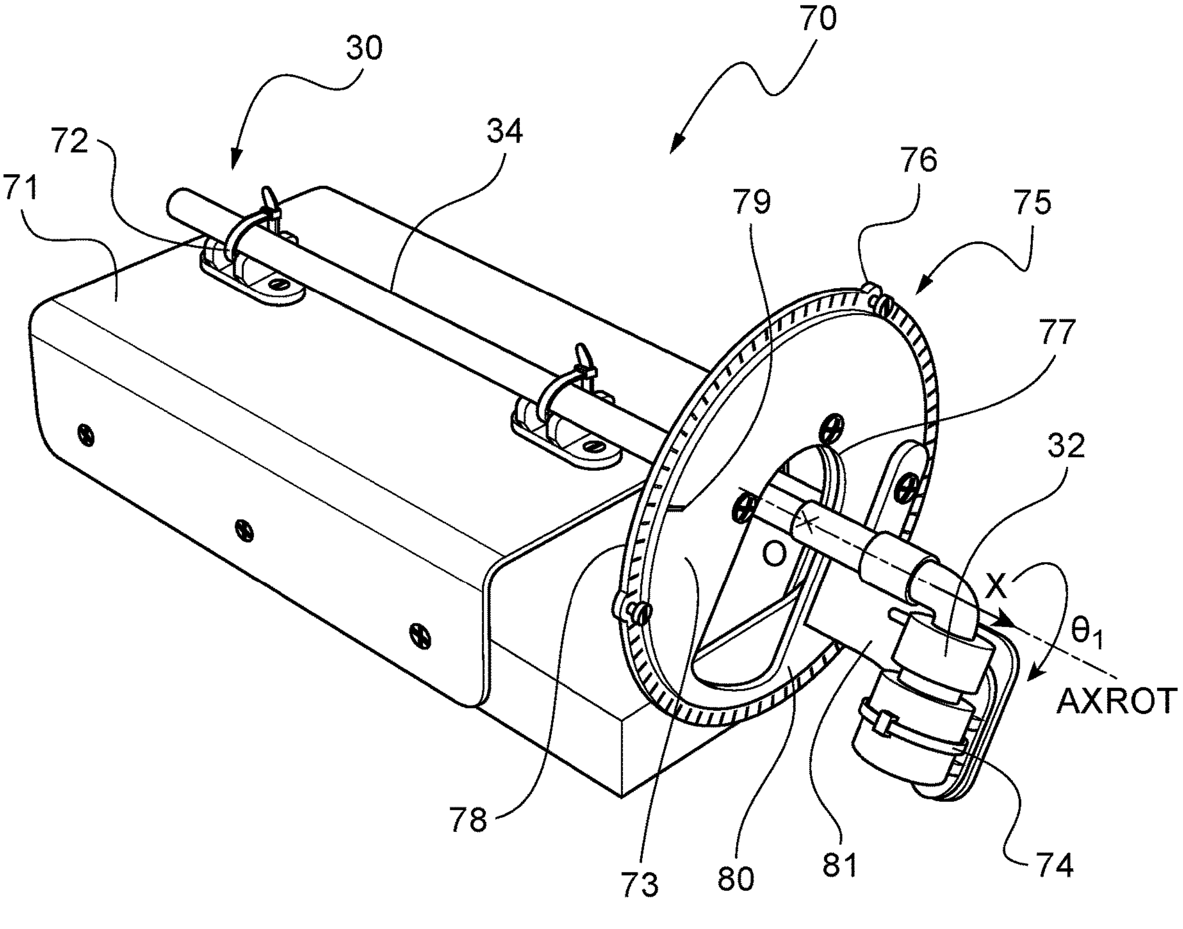
FIG. 9 is a perspective view of a tool for manufacturing an electrical harness, according to the disclosure.

As shown in FIG. 9, the disclosure also relates to a tool 70 allowing at least one secondary member 32, 42, 42', 42", 52, 52', 52", 53, 53' to be angularly positioned and held in position relative to at least one protective sheath 34, 44, 44', 44", 54, 54', 54", 55, 55' according to a relative angular orientation θ1. Such a tool 70 can then be used to help manufacture an electrical harness 30, 40, 50 according to the method 1, 10 as previously described.

This tool 70 therefore comprises a planar fixed plate 71 and at least one immobilization device 72 for immobilizing a protective sheath 34, 44, 44', 44", 54, 54', 54", 55, 55' of the electrical harness 30, 40, 50 and secure the protective sheath 34, 44, 44', 44", 54, 54', 54", 55, 55' to the fixed plate 71.

The tool 70 also comprises a movable part 73 capable of pivoting about an axis of rotation AXROT arranged parallel to the fixed plate 71. Such an axis of rotation AXROT is thus intended to coincide with a longitudinal direction OX of the protective sheath 34, 44, 44', 44", 54, 54', 54", 55, 55'.

Furthermore, at least one immobilization support 74 is configured to immobilize a secondary member 32, 42, 42', 42", 52, 52', 52", 53, 53' of the electrical harness 30, 40, 50 and constrain this secondary member 32, 42, 42', 42", 52, 52', 52", 53, 53' in rotation with the movable part 73.

The tool 70 also comprises a graduated angular scale 75 for positioning the protective sheath 34, 44, 44', 44", 54, 54', 54", 55, 55' and the secondary member 32, 42, 42', 42", 52, 52', 52", 53, 53' according to the relative angular orientation θ1.

Moreover, such a tool 70 may advantageously comprise an angular locking means 76 for locking the movable part 73 in position relative to the fixed plate 71. Such an angular locking means 76 may in particular be in the form of an indexing pin cooperating with at least one hole or at least one notch of complementary shape.

According to another example, the tool 70 may comprise at least one guide bearing 77 for guiding the movable part 73 in rotation relative to the fixed plate 71.

The tool 70 may also comprise a fixed disk 78 secured to the fixed plate 71. As shown, such a fixed disk 78 may comprise the graduated angular scale 75 for indicating the relative angular orientation θ1.

The movable part 73 may comprise a movable disk 80 comprising, in order to indicate the relative angular orientation θ1, a radial index 79 intended to be arranged opposite the graduated angular scale 75. According to another example not shown here, the movable part 73 may comprise a movable disk 80 comprising, in order to indicate the relative angular orientation θ1, the graduated angular scale 75. In this case, the radial index 79 may be arranged on the fixed plate 71 or indeed on a part secured to the fixed plate 71.

This movable part 73 may comprise a movable plate 81 on which the immobilization support or supports 74 are mounted.

Furthermore, such a tool 70 may also be used to take a measurement of the relative angular orientation θ1 on a model electrical harness 230. Once the electrical harness 30, 40, 50 has been manufactured, the tool 70 may be used to check one or more relative angular orientations θ1 before this electrical harness 30, 40, 50 is assembled on an aircraft or indeed during or after assembly if, for example, a problem is identified.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

What is claimed is:

1. A method for manufacturing an electrical harness, the electrical harness comprising at least one reference member, at least one secondary member and at least one electric wire extending between the at least one reference member and the at least one secondary member, the electrical harness comprising at least one protective sheath for protecting the at least one electric wire and at least two shrink sleeves, the at least two shrink sleeves comprising at least one reference shrink sleeve and at least one secondary shrink sleeve, the at least one reference shrink sleeve being arranged so as to at least partially cover the at least one reference member and the at least one protective sheath, the at least one secondary shrink sleeve being arranged so as to at least partially cover the at least one secondary member and the at least one protective sheath, wherein the method comprises at least the following steps:

assembling of the at least one electric wire, the at least one protective sheath, the at least two shrink sleeves, the at least one reference member and the at least one secondary member, the at least two shrink sleeves being arranged in a non-contracted state;

in a reference portion of the electrical harness, reference contraction of the at least one reference shrink sleeve, the reference contraction step allowing the at least one protective sheath to be immobilized relative to the at least one reference member, the at least one reference member allowing the electrical harness to be assigned at least one reference plane;

in a secondary portion of the electrical harness different from the reference portion, angular positioning of the at least one secondary member relative to the reference plane according to a relative angular orientation, the relative angular orientation being defined in a plane perpendicular to a longitudinal direction OX along which the at least one protective sheath extends longitudinally opposite the at least one secondary member;

holding of the at least one secondary member in position in the relative angular orientation; and secondary contraction of the at least one secondary shrink sleeve.

2. The method according to claim 1 wherein the method comprises a preliminary step of determining the relative angular orientation.

3. The method according to claim 2 wherein the preliminary step is carried out by manufacturing a model electrical harness directly on a model aircraft, the model electrical harness being different from the electrical harness and comprising at least one model reference member, at least one model secondary member, at least one model electric wire extending between the at least one model reference member and the at least one model secondary member, at least one model protective sheath for protecting the at least one model electric wire and at least two model shrink sleeves, the at least two model shrink sleeves comprising at least one model reference shrink sleeve and at least one model secondary shrink sleeve, the at least one model reference shrink sleeve being arranged so as to at least partially cover the at least one model reference member and the at least one model protective sheath, the at least one model secondary shrink sleeve being arranged so as to at least partially cover the at least one model secondary member and the at least one model protective sheath.

4. The method according to claim 3 wherein the preliminary step comprises the following sub-steps:

marking of a reference line on the at least one model protective sheath by means of marks arranged on the at least one model protective sheath;

preliminary assembling of the at least one model electric wire, the at least one model protective sheath, the at least two model shrink sleeves, the at least one model reference member and the at least one model secondary member, the at least two model shrink sleeves being arranged in a non-contracted state, the preliminary assembling sub-step being carried out on a working plane;

in a model reference portion of the model electrical harness, preliminary reference contraction allowing a model reference plane to be assigned to the model electrical harness, the model reference plane being defined by means of the marks arranged on the at least one model protective sheath;

positioning of the model electrical harness on the model aircraft and connection of at least one model secondary member with at least one piece of electrical equipment of the model aircraft;

in a model secondary portion of the model electrical harness different from the model reference portion, preliminary secondary contraction of the at least one model secondary shrink sleeve; and measuring of the relative angular orientation between the marks arranged on the at least one model protective sheath and the at least one model secondary member.

5. The method according to claim 4 wherein the sub-step of measuring the relative angular orientation is implemented with the model electrical harness being left fully mounted on the model aircraft.

6. The method according to claim 4 wherein the preliminary step comprises a sub-step of removing the model electrical harness from the model aircraft, the sub-step of measuring the relative angular orientation being implemented after the removal sub-step.

7. The method according to claim 1 wherein the at least one reference member comprises a reference connector, the at least one reference plane corresponding to a plane defined as a function of a position of the reference connector.

8. The method according to claim 1 wherein the at least one reference member comprises at least one branch joint with three branches, the at least one reference plane corresponding to a plane containing the three branches of the at least one branch joint with three branches.

9. The method according to claim 8 wherein the at least one reference member comprises two branch joints with three branches comprising a first branch joint and a second branch joint, the at least one reference plane comprising a first reference plane and a second reference plane, the at least one reference shrink sleeve comprising a first reference shrink sleeve and a second reference shrink sleeve, the first reference shrink sleeve being arranged so as to at least partially cover at least one of the three branches of the first branch joint and the at least one protective sheath, the second reference shrink sleeve being arranged so as to at least partially cover at least one of the three branches of the second branch joint and the at least one protective sheath.

10. A method for manufacturing an electrical harness, the electrical harness comprising a reference member, a secondary member and an electric wire extending between the reference member and the secondary member, the electrical harness comprising a protective sheath for protecting the electric wire and two shrink sleeves, the two shrink sleeves comprising a reference shrink sleeve and a secondary shrink sleeve, the reference shrink sleeve being arranged so as to partially cover the reference member and the protective sheath, the secondary shrink sleeve being arranged so as to partially cover the secondary member and the protective sheath, wherein the method comprises:

assembling the electric wire, the protective sheath, the two shrink sleeves, the reference member and the secondary member such that the two shrink sleeves are arranged in a non-contracted state;

in a reference portion of the electrical harness, reference contracting the reference shrink sleeve to immobilize the protective sheath relative to the reference member, the reference member allowing the electrical harness to be assigned a reference plane;

in a secondary portion of the electrical harness different from the reference portion, angular positioning the secondary member relative to the reference plane according to a relative angular orientation, the relative angular orientation being defined in a plane perpendicular to a longitudinal direction along which the protective sheath extends longitudinally opposite the secondary member;

holding the secondary member in position in the relative angular orientation; and contracting the secondary shrink sleeve.

11. The method according to claim 10 wherein the method comprises a preliminary step of determining the relative angular orientation.

12. The method according to claim 11 wherein the preliminary step is carried out by manufacturing a model electrical harness directly on a model aircraft, the model electrical harness being different from the electrical harness and comprising a model reference member, a model secondary member, a model electric wire extending between the model reference member and the model secondary member, a model protective sheath for protecting the model electric wire and two model shrink sleeves, the two model shrink sleeves comprising a model reference shrink sleeve and a model secondary shrink sleeve, the model reference shrink sleeve being arranged so as to partially cover the model reference member and the model protective sheath, the model secondary shrink sleeve being arranged so as to partially cover the model secondary member and the model protective sheath.

13. The method according to claim 12 wherein the preliminary step comprises the following sub-steps:

marking a reference line on the model protective sheath by arranging marks on the model protective sheath;

preliminary assembling model electric wire, the model protective sheath, the two model shrink sleeves, the model reference member and the model secondary member, the two model shrink sleeves being arranged in a non-contracted state, the preliminary assembling sub-step being carried out on a working plane;

in a model reference portion of the model electrical harness, preliminary reference contraction allowing a model reference plane to be assigned to the model electrical harness, the model reference plane being defined by the marks arranged on the model protective sheath;

positioning the model electrical harness on the model aircraft and connecting a model secondary member with a piece of electrical equipment of the model aircraft;

in a model secondary portion of the model electrical harness different from the model reference portion, preliminary secondary contracting the model secondary shrink sleeve; and measuring the relative angular orientation between the marks arranged on the model protective sheath and the model secondary member.

14. The method according to claim 13 wherein the sub-step of measuring the relative angular orientation is implemented with the model electrical harness being left fully mounted on the model aircraft.

15. The method according to claim 13 wherein the preliminary step comprises a sub-step of removing the model electrical harness from the model aircraft, the sub-step of measuring the relative angular orientation being implemented after the removal sub-step.

16. The method according to claim 10 wherein the reference member comprises a reference connector, the reference plane corresponding to a plane defined as a function of a position of the reference connector.

17. The method according to claim 10 wherein the reference member comprises a branch joint with three branches, the reference plane corresponding to a plane containing the three branches of the branch joint with three branches.

18. The method according to claim 17 wherein the reference member comprises two branch joints with three branches comprising a first branch joint and a second branch joint, the reference plane comprising a first reference plane and a second reference plane, the reference shrink sleeve comprising a first reference shrink sleeve and a second reference shrink sleeve, the first reference shrink sleeve being arranged so as to partially cover one of the three branches of the first branch joint and the protective sheath, the second reference shrink sleeve being arranged so as to partially cover one of the three branches of the second branch joint and the protective sheath.

* * * * *